United States Patent
Lu et al.

(10) Patent No.: US 8,833,854 B2
(45) Date of Patent: Sep. 16, 2014

(54) CHILD SEAT

(71) Applicant: BP Children's Products HK Co., Limited, Kowloon (HK)

(72) Inventors: Zu Jian Lu, Kowloon (HK); Da Liang Zhang, Kowloon (HK)

(73) Assignee: BP Childrens' Products Co. HK Limited, Hong Kong (HK)

( * ) Notice: Subject to any disclaimer, the term of this patent is extended or adjusted under 35 U.S.C. 154(b) by 0 days.

(21) Appl. No.: 13/744,556

(22) Filed: Jan. 18, 2013

(65) Prior Publication Data

US 2013/0300169 A1 Nov. 14, 2013

(30) Foreign Application Priority Data

May 10, 2012 (CN) .......................... 2012 1 0144222

(51) Int. Cl.
*B60N 2/26* (2006.01)
*B60N 2/28* (2006.01)
*A47D 1/10* (2006.01)
*B62B 9/28* (2006.01)
*B62B 9/10* (2006.01)
*B62B 3/14* (2006.01)

(52) U.S. Cl.
CPC .............. *A47D 1/103* (2013.01); *B62B 3/1452* (2013.01); *B62B 9/28* (2013.01); *B60N 2/28* (2013.01); *B60N 2/2866* (2013.01); *B60N 2/2806* (2013.01); *B62B 9/102* (2013.01)
USPC ..................... 297/253; 297/256.16

(58) Field of Classification Search
USPC ............................ 297/253, 256.16
See application file for complete search history.

(56) References Cited

U.S. PATENT DOCUMENTS

| 4,336,636 A | 6/1982 | Isiguro et al. |
| 4,632,460 A | 12/1986 | Meeker et al. |
| 5,383,708 A | 1/1995 | Nagasaka et al. |
| 5,957,531 A | 9/1999 | Kane et al. |
| 6,024,408 A * | 2/2000 | Bello et al. ................. 297/250.1 |
| 6,592,183 B2 * | 7/2003 | Kain ............................ 297/253 |
| 6,672,664 B2 * | 1/2004 | Yanaka et al. .......... 297/256.16 |
| 6,863,345 B2 * | 3/2005 | Kain ....................... 297/256.16 |

(Continued)

FOREIGN PATENT DOCUMENTS

| DE | 9202219 U1 | 2/1992 |
| DE | 102005037826 A1 | 2/2007 |

(Continued)

*Primary Examiner* — Rodney B White
(74) *Attorney, Agent, or Firm* — David I. Roche; Baker & McKenzie LLP (57) ABSTRACT

A child seat includes a seat shell, and an anchoring system assembled with the seat shell. The anchoring system includes a housing, a latch assembled in the housing, a first and a second strap respectively routed through the housing, and two anchor fasteners respectively secured with the first and second straps at a rear of the seat shell. The housing has a central axis, and a first and a second opening spaced apart from each other along the central axis. The latch is movable along the central axis relative to the housing, and has two clamping surfaces facing two inner surfaces of the housing. The latch is operable to clamp the first and second straps respectively between the two inner surfaces and the two clamping surfaces. The first and second straps extend outside the seat shell at the rear, and also at two opposite lateral sides of the seat shell.

20 Claims, 5 Drawing Sheets

(56) References Cited

U.S. PATENT DOCUMENTS

| | | |
|---|---|---|
| 6,908,100 B2 | 6/2005 | Kassai et al. |
| 7,159,948 B1 * | 1/2007 | Wolf .......................... 297/253 X |
| 7,163,265 B2 * | 1/2007 | Adachi ................ 297/256.16 X |
| 7,445,230 B2 | 11/2008 | Kassai et al. |
| 7,597,396 B2 | 10/2009 | Longenecker et al. |
| 8,056,975 B2 | 11/2011 | Longenecker et al. |
| 8,141,950 B2 * | 3/2012 | Boyer ........................ 297/253 X |
| 8,256,840 B2 * | 9/2012 | Dasent et al. .................. 297/253 |
| 8,444,222 B2 * | 5/2013 | Buckingham et al. ........ 297/253 |
| 2003/0030311 A1 | 2/2003 | Woodard et al. |
| 2003/0197415 A1 | 10/2003 | Dingman |
| 2013/0127218 A1 * | 5/2013 | Carpenter et al. ............ 297/253 |

FOREIGN PATENT DOCUMENTS

| | | |
|---|---|---|
| EP | 1078809 A1 | 2/2001 |
| EP | 2233348 A1 | 9/2010 |
| EP | 2394842 A2 | 12/2011 |
| GB | 2492474 A | 1/2013 |

* cited by examiner

CHILD SEAT

CROSS-REFERENCE TO RELATED APPLICATION

This application claims priority to Chinese Patent Application No. 201210144222.1 filed on May 10, 2012, which is incorporated herein by reference.

BACKGROUND

1. Field of the Invention

The present inventions relate to child seats, such as booster seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which has an internal restraint harness more adapted to provide protection for the young child.

When the child has an older age (e.g., above two years old), the child safety seat may no longer be adapted to receive the child of a larger size. In this case, the seatbelts of the vehicle have to be used for restraining the child. However, because the child is not as tall as an adult, a booster seat may be needed to increase the height so that the seatbelt can be properly wrapped around the body of the child to provide protection. Unlike the child safety seat, the booster seat is simply placed on the vehicle passenger's seat and does not have any attachment. As a result, undesirable displacement of the booster seat may occur.

Therefore, there is a need for a child seat (such as booster seat) that can be more securely installed, and address at least the foregoing issues.

SUMMARY

The present application describes an anchoring system of a child seat that can be operable to securely attach a child seat with a support, such as a vehicle passenger's seat, a stroller apparatus, or a regular adult chair. In one embodiment, the child seat includes a seat shell, and an anchoring system assembled with the seat shell. The anchoring system includes a housing, a latch assembled in the housing, a first and a second strap respectively routed through the housing, and two anchor fasteners respectively secured with the first and second straps at a rear of the seat shell. The housing has a central axis, and a first and a second opening spaced apart from each other along the central axis. The latch is movable along the central axis relative to the housing, and has two clamping surfaces facing two inner surfaces of the housing. The first and second straps are respectively routed through the first and second openings of the housing. The latch is operable to clamp the first and second straps respectively between the two inner surfaces of the housing and the two clamping surfaces, the first strap extending outside the seat shell at the rear and a first lateral side of the seat shell, and the second strap extending outside the seat shell at the rear and a second lateral side opposite the first lateral side.

DETAILED DESCRIPTION OF THE EMBODIMENTS

The present application describes an anchoring system of a child seat that can be operable to securely attach a child seat with a support, such as a vehicle passenger's seat, a stroller apparatus, or a regular adult chair. The anchoring system can be easy to actuate for locking and unlocking the child seat.

Figure 1A:
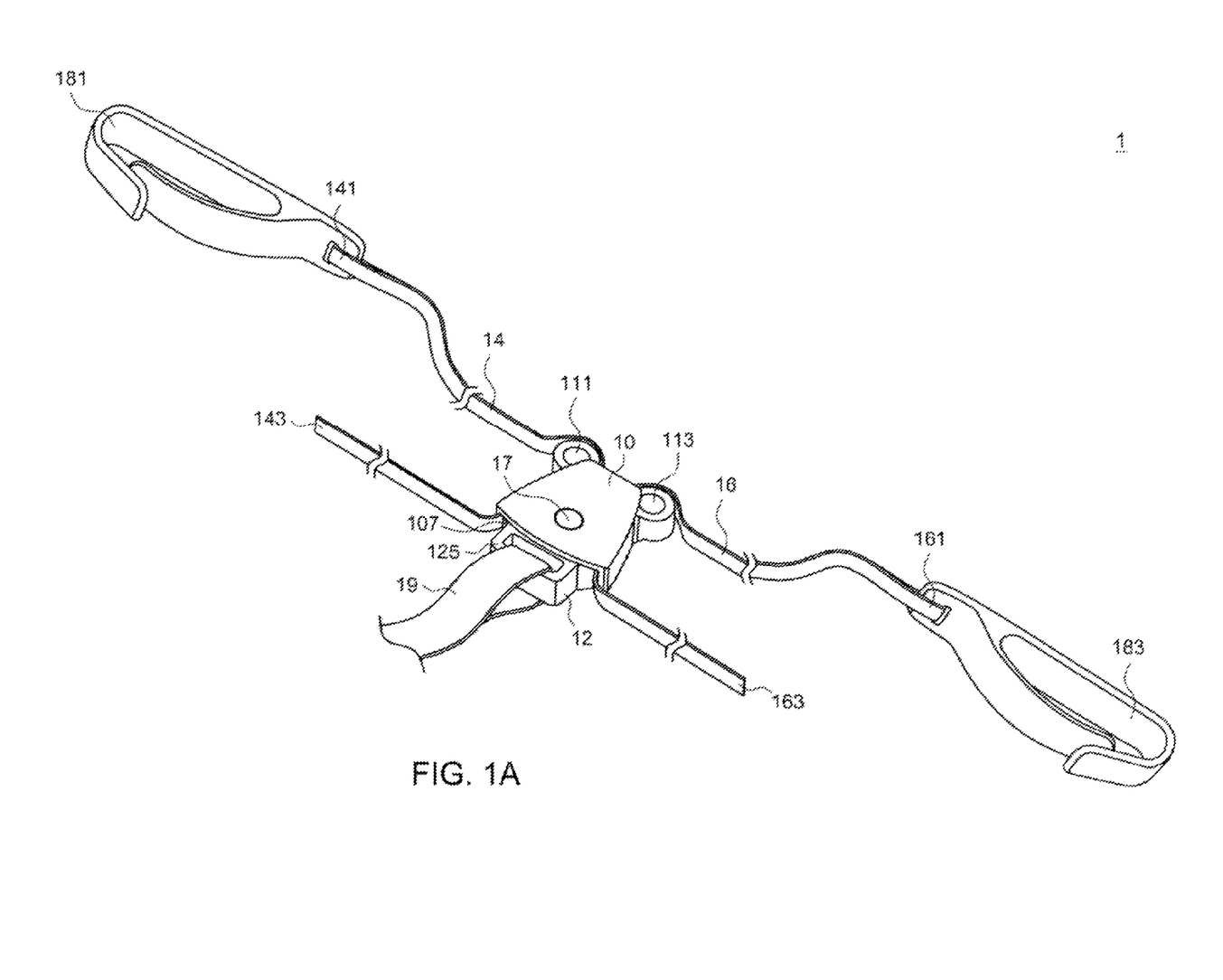
FIG. 1A is a perspective view illustrating an embodiment of an anchoring system implemented in a child seat.
Figure 1B:
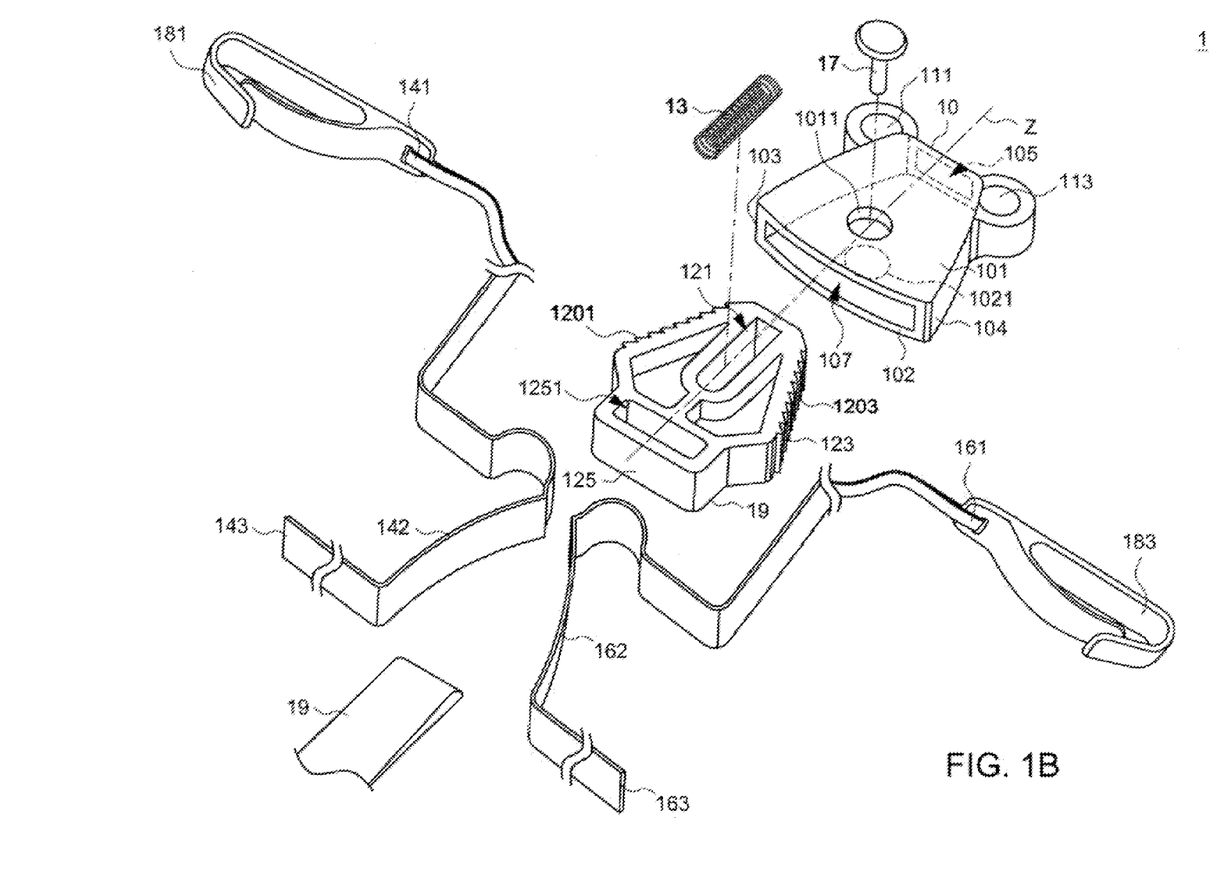
FIG. 1B is an exploded view of the anchoring system shown in FIG. 1A.
Figure 1C:
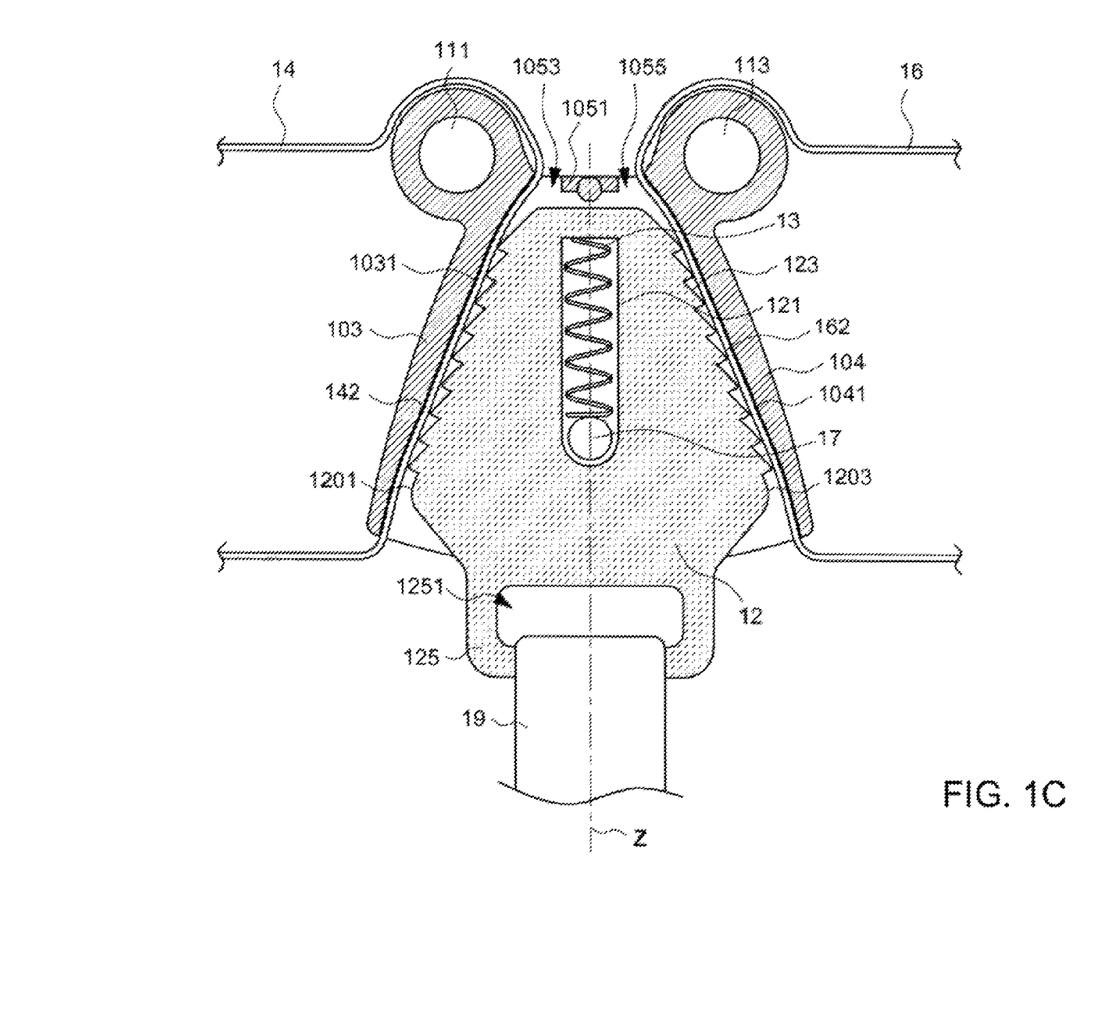
FIG. 1C is a cross-sectional view of the anchoring system shown in FIG. 1A.

FIGS. 1A, 1B and 1C are respectively perspective, exploded and cross-sectional views illustrating an embodiment of an anchoring system 1 implemented in a child seat. The anchoring system 1 can include a housing 10, a latch 12, a spring 13, first and second straps 14 and 16, and a connecting element 17. In one embodiment, the latch 12 can be formed integrally in a single piece. The latch 12 can be movably assembled in the housing 10, and connect with the spring 13. The spring 13 can urge the latch 12 toward a locking position. The connecting element 17 can be assembled through the housing 10 and the latch 12. The first and second straps 14 and 16 can be respectively clamped between the latch 12 and the housing 10. Respective portions of the first and second straps 14 and 16 that passes through the interior of the housing 10 can be spaced apart from each other. The two straps 14 and 16 can accordingly travel along separate and distinct paths through the housing 10, and can be independently operable. According to one embodiment, the first and second straps 14 and 16 can be made of webbing materials, such as nylon, cotton yarns, linen fibers, polymer fibers or the like.

The housing 10 can include a plurality of sidewalls 101, 102, 103 and 104 that define at least partially an inner cavity of the housing 10. The sidewalls 101 and 102 can be facing each other at two opposite sides of the housing 10, the sidewalls 103 and 104 can be facing each other at two other opposite sides of the housing 10, each of the sidewalls 101 and 102 having two opposite ends respectively connected with the sidewalls 103 and 104. The housing 10 can have a central axis Z, and can include first and second openings 105 and 107 at two opposite sides. In some embodiment, the first and second openings 105 and 107 can be respectively aligned with the central axis Z. In other embodiments, the first and second openings 105 and 107 may also be offset from each other in position, so that they are not aligned with each other.

The sidewalls 101 and 102 of the housing 10 can respectively include holes 1011 and 1021 that are aligned with each other for the passage and attachment of the connecting element 17 through the housing 10. Examples of the connecting element 17 can include, without limitation, a rivet, a pin and the like. The sidewalls 103 and 104 can respectively have inner surfaces 1031 and 1041 that are facing each other and extend from the first opening 105 to the second opening 107. The inner surfaces 1031 and 1041 can have curved shapes that correspond to contour portions of the latch 12. As shown, the inner surfaces 1031 and 1041 can respectively extend at an angle at two sides of the central axis Z symmetric to each other, the distance between the inner surfaces 1031 and 1041 gradually increasing from the first opening 105 toward the second opening 107. In one embodiment, the housing 10 can be formed integrally by plastic molding.

Referring to FIG. 1C, the housing 10 can have a solid spacing block 1051 that is connected between the sidewalls 101 and 102 and is arranged so as to divide the first opening 105 into two distinct slits 1053 and 1055 for passage of the first and second straps 14 and 16, respectively. In alternate embodiments, the spacing block 1051 may also be omitted.

The housing 10 can also include one or more attach holes through which a fastener (e.g., screw) can be engaged to fixedly secure the anchoring system 1 with a child seat. For example, the housing 10 can include two symmetric attach holes 111 and 113 adjacent to the first opening 105 through which a screw can pass to engage with a corresponding lock hole on the child seat.

The first strap 14 can include a first portion 141, a second portion 143, and an intermediate portion 142 between the first and second portion 141 and 143. The first portion 141 can extend outward from the first opening 105, the second portion 143 can extend outward from the second opening 107, and the intermediate portion 142 can be arranged in the housing 10. Likewise, the second strap 16 can include a first portion 161, a second portion 163, and an intermediate portion 162 between the first and second portion 161 and 163. The first portion 161 can extend outward from the first opening 105, the second portion 163 can extend outward from the second opening 107, and the intermediate portion 162 can be arranged in the housing 10. The first strap 14 (including the first, intermediate and second portions 141, 142 and 143) can be entirely formed from a single webbing material. Likewise, the second strap 16 (including the first, intermediate and second portions 161, 162 and 163) can be entirely formed from a single webbing material separate and distinct from the first strap 14. Accordingly, the first and second straps 14 and 16 can be independently operated and adjusted.

The first portion 141 of the first strap 14 and the first portion 161 of the second strap 16 can be respectively provided with anchor fasteners 181 and 183 that are adapted to attach with a vehicle passenger's seat for securing the child seat thereon. In one embodiment, the anchor fasteners 181 and 183 can be hook or loop structures. The second portions 143 and 163 can respectively form actuating ends at which a user can respectively grasp and pull the first and second straps 14 and 16 outward from the second opening 107 for adjusting the tension or extension length of the straps.

The latch 12 can be integrally in a single piece, and can have first and second clamping surfaces 1201 and 1203 respectively formed at two opposite sides. The curvatures of the first and second clamping surfaces 1201 and 1203 can substantially match with the curvatures of the inner surfaces 1031 and 1041 of the housing 10, respectively. In particular, the first and second clamping surfaces 1201 and 1203 can be inclined symmetrical relative to the central axis Z, the distance between the first and second clamping surfaces 1201 and 1203 gradually increasing from the first opening 105 toward the second opening 107. When the latch 12 is assembled with the housing 10, the intermediate portion 142 of the first strap 14 can extend between the first clamping surface 1201 and the inner surface 1031, and the intermediate portion 162 of the second strap 16 can extend between the second clamping surface 1203 and the inner surface 1041. The latch 12 can be movable along the central axis Z to respectively increase and decrease the gap between the clamping surface 1201 and the inner surface 1031 and the gap between the clamping surface 1203 and the inner surface 1041 for clamping or unclamping the intermediate portions 142 and 162 of the straps 14 and 16.

According to one embodiment, the clamping surfaces 1201 and 1203 can respectively include protruding teeth 123 to increase the gripping action applied by the latch 12 on the straps 14 and 16. In particular, the teeth 123 can protrude inclined toward the second opening 107. When the first strap 14 or second strap 16 is pulled toward the first opening 105, the inclination of the teeth 123 on the latch 12 can act to more firmly grip the strap 14 or 16. It is worth noting that alternate embodiments may have the teeth 123 formed on the inner surfaces 1031 and 1041 of the housing 10 only, or on the clamping surfaces 1201 and 1203 of the latch 12 and also the inner surfaces 1031 and 1041 of the housing 10.

The latch 12 can include a slot 121 arranged between the clamping surfaces 1201 and 1203. The slot 121 can be aligned with and extend along the central axis Z. The slot 121 can be sized so as to receive the placement of the spring 13. One end of the slot 121 can be communicate with the holes 1011 and 1021 for passage of the connecting element 17 through the latch 12. As shown in FIG. 1C, the spring 13 can have one end connected with the connecting element 17, and another end connected with an inner sidewall of the slot 121. The spring 13 can bias the latch 12 toward the inner surfaces 1031 and 1041.

Biased by the spring action from the spring 13, the latch 12 can respectively clamp the intermediate portion 142 of the strap 14 between the inner surface 1031 of the housing 10 and the clamping surface 1201 of the latch 12, and the intermediate portion 162 of the strap 16 between the inner surface 1041 of the housing 10 and the clamping surface 1203. In this manner, the latch 12 can lock the length of the straps 14 and 16 that extend outward from the first opening 105.

It is worth noting that the clamped portions of the straps 14 and 16 inside the housing 10 are spaced apart from each other by the latch 12, and the portions of the straps 14 and 16 that extend outward from the openings 105 and 107 are also spaced apart from each other by the latch 12. Accordingly, the distance between the portions of the straps 14 and 16 that pass through the housing 10 is substantially defined by the transversal distance between the two clamping surfaces 1201 and 1203 of the latch 12.

When the second portion 143 of the strap 14 is pulled in a direction away from the second opening 107, the friction between the intermediate portion 142 and the clamping surface 1201 of the latch 12 can cause displacement of the latch 12 toward the second opening 107. As a result, the latch 12 can release its clamping action, and any of the straps 14 and 16 can be adjusted independently.

Likewise, when the second portion 163 of the strap 16 is pulled in a direction away from the second opening 107, the friction between the intermediate portion 162 and the clamping surface 1203 of the latch 12 can cause displacement of the latch 12 toward the second opening 107. As a result, the latch 12 can release its clamping action, and any of the straps 14 and 16 can be adjusted independently.

In addition, the latch 12 can include an actuating portion 125 located adjacent to the second opening 107. A pulling force can be applied at the actuating portion 125 to drive displacement of the latch 12 in a direction toward the outside of the second opening 107. The latch 12 can thereby compress the spring 13 and unclamp the straps 14 and 16, such that the intermediate portions 142 and 162 of the straps 14 and 16 can be movably adjusted through the housing 10.

In one embodiment, the actuating portion 125 can be disposed so as to protrude outside the second opening 107 for facilitating access to the latch 12. In some embodiment, the actuating portion 125 may also be provided with an extending part of an elongated shape. The extending part may be a handle (not shown) assembled or formed integrally with the latch 12, or a strap 19 attached with the actuating portion 125. For connecting the strap 19 with the latch 12, the actuating portion 125 can have a slit 1251 through which the strap 19 can loop to attach with the latch 12.

Figure 2A:
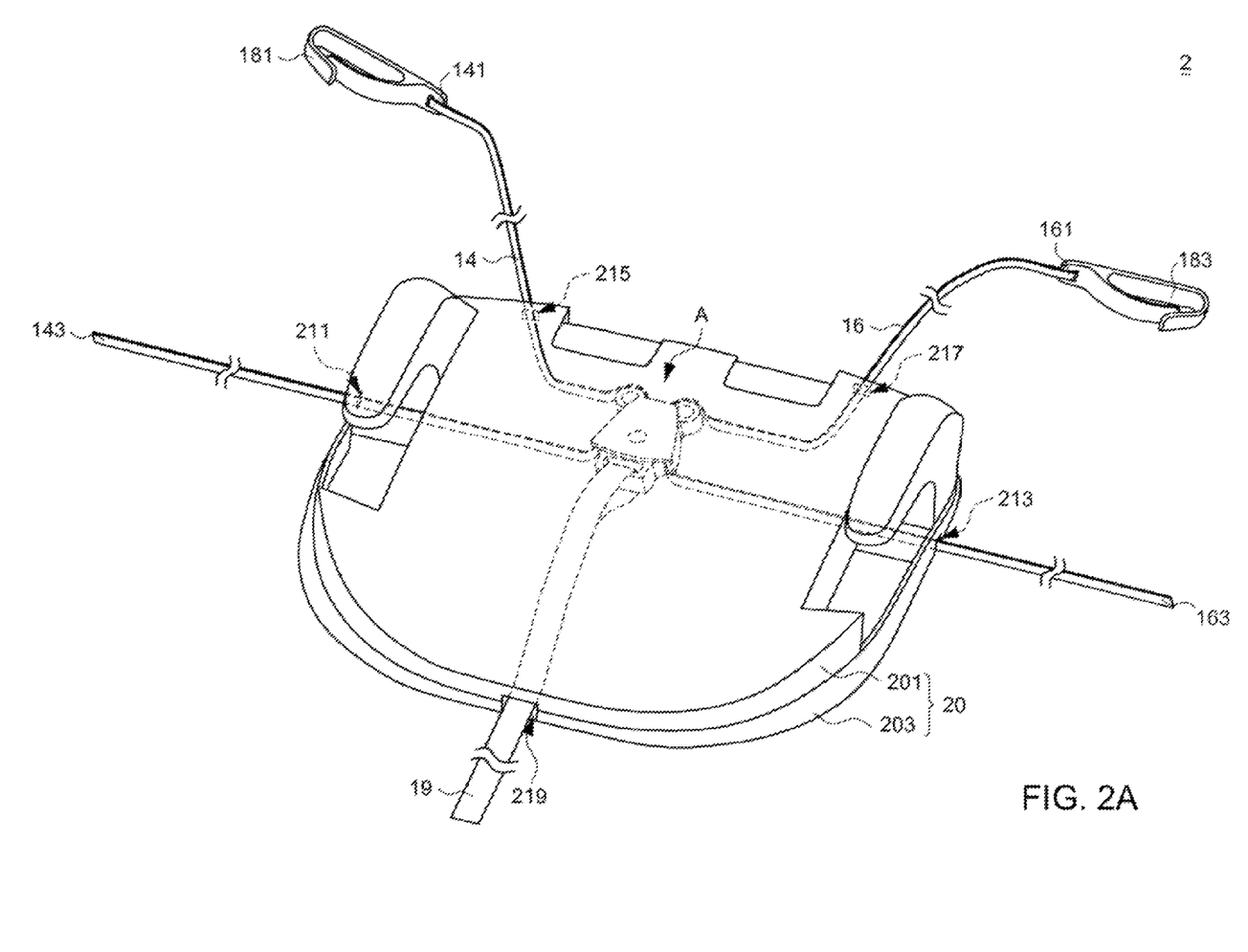
FIG. 2A is a schematic view illustrating a child seat provided with the anchoring system shown in FIG. 1A.
Figure 2B:
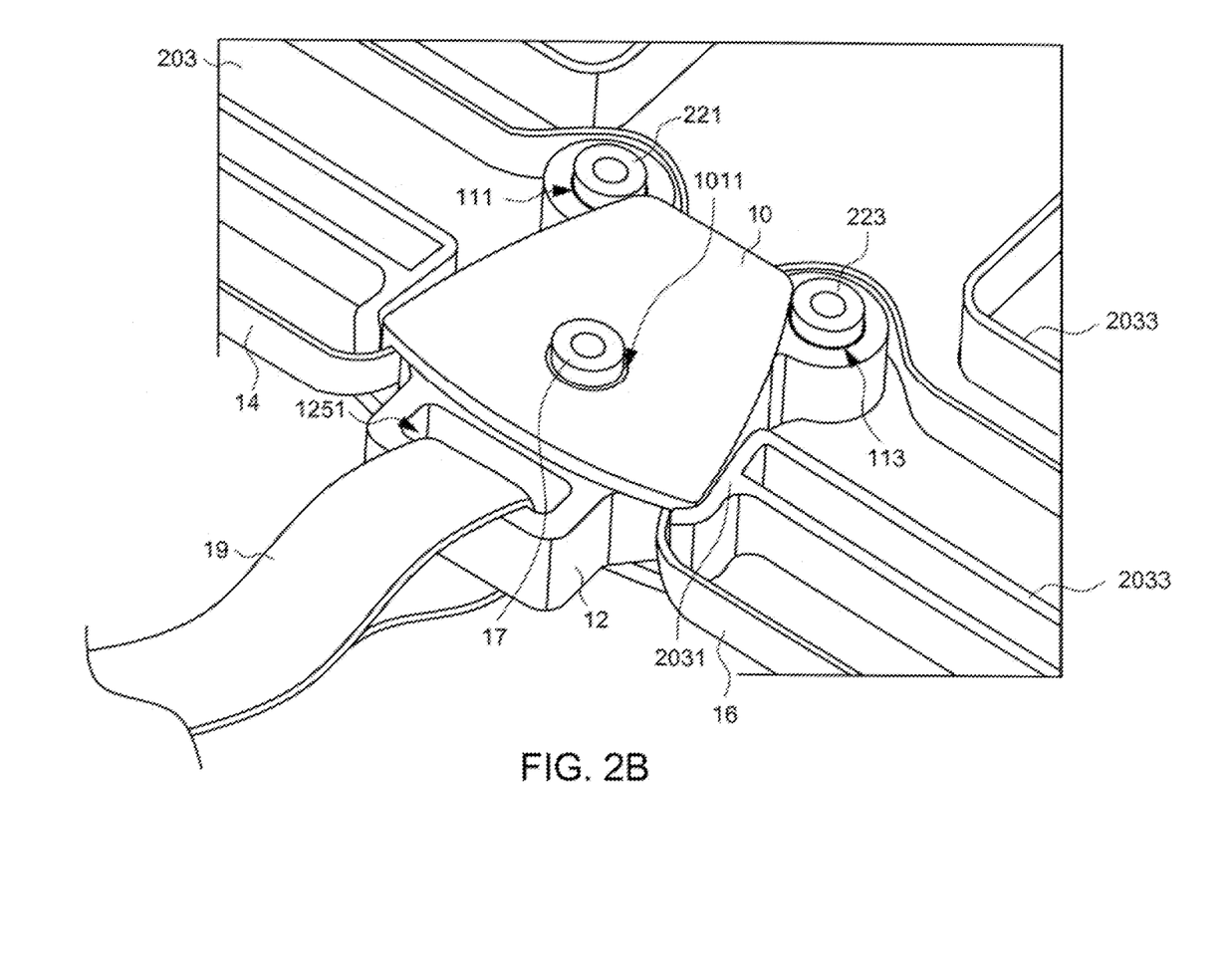
FIG. 2B is a partially enlarged view of portion A shown in FIG. 2A.

FIG. 2A is a schematic view illustrating a child seat 2 provided with the anchoring system 1, and FIG. 2B is a partially enlarged view of portion A shown in FIG. 2A. The child seat 2 can include a seat shell 20 formed from the assembly of upper and lower shell portions 201 and 203. In one embodiment, the child seat 2 can be exemplary a booster seat. The anchoring system 1 can be assembled in the seat shell 20. In particular, the housing 10 of the anchoring system 1 can be fixedly installed on the lower shell portion 203 at a position adjacent to the rear of the child seat 2 and below an upper sitting surface of the seat shell 20. Portions of the straps 14 and 16 extending outward from the openings 105 and 107 of the housing 10 can be respectively routed to the outside of the seat shell 20. The seat shell 20 can have side edges provided with a plurality of openings through which the straps 14, 16 and 19 can respectively extend outward.

In one embodiment, the left and right side edges of the seat shell 20 can include openings 211 and 213 through which portions of the straps 14 and 16 (in particular the second portions 143 and 163) can extend outward at left and right sides of the seat shell 20. A front edge of the seat shell 20 can also include an opening 219 through which the strap 19 can extend outward at the front of the seat shell 20. A rear edge of the seat shell 20 can include two openings 215 and 217 through which portions of the straps 14 and 16 (in particular the first portions 141 and 161) extend outward at the rear of the seat shell 20 and are connected with anchor fasteners 181 and 183.

As shown in FIG. 2B, the lower shell portion 203 can have an inner side provided with a cavity 2031 and a guide structure 2033. The cavity 2031 can receive the placement of the housing 10. A bottom of the cavity 2031 can be provided with engaging holes 111 and 113 through which anchoring members 221 and 223 passing through the housing 10 can engage to affix the housing 10 with the seat shell 20. Moreover, the connecting element 17 can pass through the holes 1011 and 1021 of the housing 10 and engage with a locking hole (not shown) formed through the lower shell portion 203. In some embodiments, the connecting element 17 and the anchoring members 221 and 223 may be formed as studs protruding from the interior of the seat shell 20.

The guide structure 2033 can be adapted to route portions of the straps 14 and 16 lying outside the housing 10 toward the openings 211, 213, 217 and 215. In one embodiment, the guide structure 2033 can include sidewalls that extend at an angle relative to a movement axis of the latch 12. For example, the latch 12 can move along the central axis Z, and the guide structure 2033 can include sidewalls that extend perpendicular to the central axis Z. The portions of the straps 14 and 16 that extend outward from the openings 105 and 107 of the housing 10 can be routed by the guide structure 2033 along a transversal axis of the seat shell 20 (i.e., parallel to the width of the seat shell 20) that is substantially perpendicular to the central axis Z.

When the child seat 2 is to be installed on a vehicle passenger's seat, the anchor fasteners 181 and 183 can be respectively attached with an anchorage fixture of the vehicle passenger's seat. The portions of the straps 14 and 16 extending outward at the left and right sides of the child seat 2 then can be actuated for adjustment. For example, the second portion 143 of the strap 14 can be pulled outward at the left side of the child seat 2, which can reduce a length of the strap 14 extending outward from the opening 215 of the child seat 2. While the strap 14 is pulled outward, the frictional contact between the strap 14 and the latch 12 can cause the latch 12 to move along the central axis Z toward the second opening 107. As a result, the latch 12 can unclamp the straps 14 and 16, and the second portion 163 of the strap 16 can be pulled outward from the right side of the seat shell 20 to reduce a length of the strap 16 extending outward from the opening 217.

As the lengths of the straps 14 and 16 extending outward from the openings 215 and 217 shorten, the child seat 2 can become closer to a seatback of the vehicle passenger's seat. When the pulling action is released, the spring 13 can urge the latch 12 to recover its clamping position. The straps 14 and 16 can be thereby held in a tensioned state, and the child seat 2 can be locked in place on the vehicle passenger's seat.

When the child seat 2 is to be removed from the vehicle passenger's seat, the strap 19 can be pulled out from the front of the child seat 2, such that the latch 12 can move toward the second opening 107 and unclamp the straps 14 and 16. Then the child seat 2 can be displaced forward, which increases the lengths of the straps 14 and 16 extending outward from the openings 215 and 217 at the rear of the seat shell 20. Since more of the first portions 141 and 161 of the straps 14 and 16 extend outward, the disengagement of the anchor fasteners 181 and 183 from the anchorage fixture can be facilitated.

At least one advantage of the structures described herein is the ability to provide a child seat having an anchoring system that is easy to operate, and can allow to removably attach the child seat with a support structure such as a vehicle passenger's seat, adult seat and the like.

Realizations of the child seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child seat comprising:
   a seat shell; and
   an anchoring system assembled with the seat shell, the anchoring system including:
   a housing having a central axis, and a first and a second opening spaced apart from each other along the central axis;
   a latch assembled in the housing and movable along the central axis relative to the housing, the latch having two clamping surfaces facing two inner surfaces of the housing;
   a first strap and a second strap respectively routed through the first and second openings of the housing; and
   two anchor fasteners respectively secured with the first and second straps at a rear of the seat shell;
   wherein the latch is operable to clamp the first and second straps respectively between the two inner surfaces of the housing and the two clamping surfaces, the first strap extending outside the seat shell at the rear and a first lateral side of the seat shell, and the second strap extending outside the seat shell at the rear and a second lateral side opposite the first lateral side.

2. The child seat according to claim 1, wherein the first strap is routed through an interior of the seat shell and extends outside the seat shell at the rear and a left side, the second strap is routed through the interior of the seat shell and extends outside the seat shell at the rear and a right side.

3. The child seat according to claim 1, wherein the anchoring system includes a spring operable to bias the latch toward the two inner surfaces of the housing to clamp the first and second straps.

4. The child seat according to claim 3, wherein the latch includes a slot arranged between the two clamping surfaces, the anchoring system further includes a connecting element passing through the slot of the latch, and the spring is disposed in the slot with two ends of the spring being respectively connected with an inner sidewall of the slot and the connecting element.

5. The child seat according to claim 1, wherein the two anchor fasteners include hook or loop structures.

6. The child seat according to claim 1, wherein the two clamping surfaces respectively include protruding teeth.

7. The child seat according to claim 6, wherein the teeth protrude inclined toward the second opening.

8. The child seat according to claim 1, wherein the latch includes an actuating portion, the actuating portion being operable to drive displacement of the latch toward an outside of the second opening such that the latch unclamps the first and second straps, whereby the first and second straps are movable relative to the housing and the latch for adjustment.

9. The child seat according to claim 8, further including a third strap connected with the actuating portion.

10. The child seat according to claim 9, wherein the third strap extends outward from a front of the seat shell.

11. The child seat according to claim 1, wherein the two clamping surfaces are inclined symmetrical relative to the central axis, a distance between the two clamping surfaces gradually increasing from the first opening toward the second opening.

12. The child seat according to claim 1, wherein the housing is affixed adjacent to the rear of the seat shell.

13. The child seat according to claim 1, wherein the first and second straps are adjustable independently from each other.

14. The child seat according to claim 1, wherein the first strap is entirely formed from a first single webbing material, the second strap is entirely formed from a second single webbing material separate from the first strap.

15. The child seat according to claim 1, wherein respective portions of the first and second straps extending outward from the first and second openings of the housing are routed along a transversal axis of the seat shell and substantially perpendicular to the central axis.

16. A child seat comprising:
a seat shell;
a housing fixedly secured inside the seat shell, the housing having a central axis, and a first and a second opening spaced apart from each other along the central axis;
a first strap and a second strap respectively routed through the first and second openings of the housing; and
two anchor fasteners respectively secured with the first and second straps at a rear of the seat shell;
a latch assembled in the housing and movable along the central axis relative to the housing, the latch having two clamping surfaces facing two inner surfaces of the housing; and
a third strap connected with the latch;
wherein the latch is operable to clamp the first and second straps respectively between the two inner surfaces of the housing and the two clamping surfaces, and the third strap is operable to displace the latch in a direction that releases the first and second straps for adjustment.

17. The child seat according to claim 16, wherein the first strap extends outside the seat shell at the rear and a left side of the seat shell, and the second strap extends outside the seat shell at the rear and a right side of the seat shell, and the third strap extends outward from a front of the seat shell.

18. The child seat according to claim 16, further including a spring operable to bias the latch toward the two inner surfaces of the housing to clamp the first and second straps.

19. The child seat according to claim 16, wherein the housing is affixed adjacent to the rear of the seat shell.

20. The child seat according to claim 16, wherein the first and second straps are adjustable independently from each other.

* * * * *